United States Patent
Kosaka et al.

[11] 3,963,000
[45] June 15, 1976

[54] SYSTEM FOR REFORMING ENGINE FUEL INTO HYDROGEN GAS-CONTAINING MIXTURE BY CATALYTIC REACTION

[75] Inventors: Katuaki Kosaka, Tokyo; Zene Ueno, Fuchu; Tadahiko Nagaoka, Tokorozawa, all of Japan

[73] Assignee: Nissan Motor Co., Ltd., Yokohama, Japan

[22] Filed: Dec. 19, 1974

[21] Appl. No.: 534,290

[30] Foreign Application Priority Data
Mar. 6, 1974 Japan.............................. 49-25915

[52] U.S. Cl.................................. 123/3; 123/25 R; 123/1 A; 123/119 A; 123/119 E; 48/107
[51] Int. Cl.²........................................ F02B 43/08
[58] Field of Search................ 123/1 A, 3, 66, 69 R, 123/119 R, 119 A, 119 C, 25 R, 119 E; 48/102 A, 107

[56] References Cited
UNITED STATES PATENTS

| | | |
|---|---|---|
| 3,635,200 | 1/1972 | Rundell et al. ........................ 123/3 |
| 3,672,341 | 6/1972 | Smith et al. .................... 123/DIG. 12 |
| 3,682,142 | 8/1972 | Newkirk ....................... 123/DIG. 12 |
| 3,709,203 | 1/1973 | Cettin et al. ..................... 123/1 A X |
| 3,717,129 | 2/1973 | Fox ..................................... 123/1 A |
| 3,798,005 | 3/1974 | Koch ..................................... 48/107 |
| 3,817,232 | 6/1974 | Nakajima et al. ............... 123/1 A X |
| 3,828,736 | 8/1974 | Koch ...................................... 123/3 |
| 3,871,838 | 3/1975 | Henkel et al. ........................ 48/107 |
| 3,897,225 | 7/1975 | Kodi ................................... 123/3 X |

*Primary Examiner*—Charles J. Myhre
*Assistant Examiner*—Ira S. Lazarus

[57] ABSTRACT

The system fundamentarily consists of a means to prepare a substantially gaseous mixture of a fuel, e.g., hydrocarbons, oxygen and water, a heated catalyst chamber and a reciprocating compressor. The compressor is arranged and valve-controlled such that the fuel mixture is pressurized before the feeding into the catalyst chamber and the heated and pressurized $H_2$-containing mixture is drawn into and expanded in the working chamber of the compressor before the feeding into an engine. The means to prepare the starting fuel mixture may include a sub-system for producing oxygen and water from hydrogen peroxide.

8 Claims, 3 Drawing Figures

SYSTEM FOR REFORMING ENGINE FUEL INTO HYDROGEN GAS-CONTAINING MIXTURE BY CATALYTIC REACTION

This invention relates to a system for reforming an organic fuel for feeding into an engine into another type of fuel mixture containing a relatively large amount of hydrogen gas by catalytic reactions with oxygen and water.

It is well known that organic fuels such as hydrocarbons derived from petroleum and oxygen-containing compounds such as alcohols, aldehydes and ketones can be reformed or converted into fuel mixtures containing relatively large amounts of hydrogen gas. For example, a mixture of atomized light oil, oxygen (or air) and water is converted into a differently composed hot gaseous mixture containing hydrogen, carbon monoxide, carbon dioxide and possibly steam upon contact with a nickel or lime-base catalyst heated to about 800°C. The similar conversion can be accomplished with methanol by using a zinc oxide and/or chromium oxid-base catalyst heated to about 300°C.

These techniques have been applied to various engines including automotive engines because a hydrogen-gas containing fuel is advantageous for reducing the concentrations of harmful substances in the exhaust gas. It has been proposed in the field of automotive engines to utilize the engine exhaust gas as a heat source for heating the catalyst and/or utilize the water in the exhaust gas as at least a portion of the water component of the starting mixture. The resulting hydrogen-containing gaseous mixture is cooled to an adequate temperature and supplied to the engine as the main or an auxiliary fuel.

It is of practical importance that a mixture of an ordinary fuel, oxygen (or air) and water (hereinafter will be referred to simply as the primary mixture) is converted into a gaseous fuel mixture containing a relatively large amount of hydrogen together with carbon monoxide (hereinafter will be referred to as the reformed mixture) in good efficiency, particularly with respect to relatively small-sized systems such as the conversion systems for automotive engines. As mentioned above, the reformed mixture may further contain minor amounts of carbon dioxide and steam.

It is an object of the present invention to provide an improved system for reforming the above described primary mixture into the above described reformed mixture for use in an engine, which system allows the reformation reactions to be accomplished in improved efficiencies and the pressure and temperature of the reformed mixture to be reduced effectively.

The invention is concerned with a known system, which fundamentarily consists of first means to prepare the primary mixture containing at least an organic fuel, oxygen and water substantially in the gaseous form, a reaction chamber containing a catalyst capable of converting the primary mixture into a gaseous fuel mixture containing at least hydrogen and carbon monoxide, and second means to heat the catalyst. According to the invention, the system further comprises a reciprocating compressor having at least one working chamber defined above a piston and provided with an intake valve and a discharge valve. The compressor is fluidly connected with the first means, the reaction chamber and an engine such that both the first means and the engine communicate with the reaction chamber through the compressor. The compressor is constructed such that the primary mixture is compressed in the working chamber thereof and subsequently forced out into the reaction chamber and that the fuel mixture reformed in the reaction chamber is drawn into and expanded in the working chamber and subsequently discharged therefrom into the engine.

The advantages of the invention reside mainly in that the efficiencies of the reformation reactions in the reaction chamber are improved due to the feeding of the pressurized primary mixture, and that the expansion of the reformed mixture in the working chamber not only achieves the reduction in the pressure and temperature of the reformed mixture but also allows the compressor to run self-sustainingly.

According to the invention, the first means may include a sub-system for catalytically decomposing hydrogen peroxide into a heated mixture of oxygen and water, so that the efficiencies of the reformation reaction are further improved.

The invention will be fully understood from the following detailed description of the preferred embodiments thereof with reference to the accompanying drawings, in which.

Figure 1:
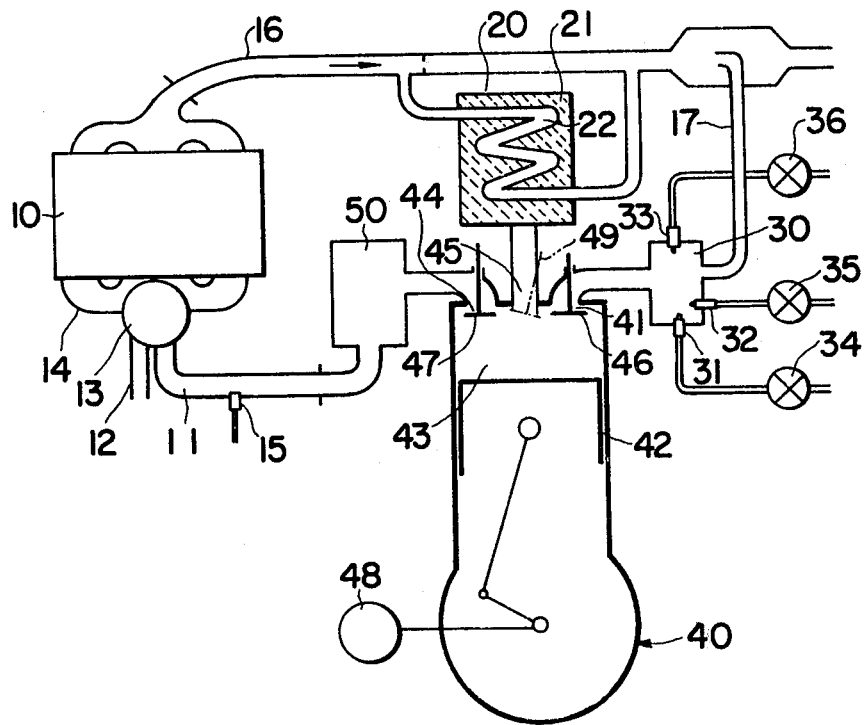
FIG. 1 is a diagram showing a general constitution and arrangement of a system according to the invention for reforming a fuel prior to the feeding thereof into an engine.

In FIG. 1, the reference numeral 10 indicates a conventional engine, e.g., of a motor vehicle. The intake system of the engine 10 includes a fuel induction passage 11, an air induction passage 12, a mixer 13 for the preparation of a combustible mixture and an intake manifold 14. The fuel induction passage 11 is equipped with a fuel injection nozzle 15 communicating with a usual fuel system (not shown). The engine 10 is provided with an exhaust pipe 16, and preferably a recirculation duct 17 is branched therefrom to recirculate a portion of the exhaust gas into the intake system.

A conventional reaction chamber 20 for the fuel reformation contains a catalyst 21 and a heat exchanger 22. The heat exchanger 22 is connected to the exhaust pipe 16 so as to cause a portion of the hot exhaust gas to pass therethrough on the way to the branch point of the recirculation duct 17. The catalyst 21 is selected from various conventional catalysts which catalyze the decomposition or hydrogenation of organic fuels such as hydrocarbons, alcohols, aldehydes and/or ketones (hereinafter will be referred to as the primary fuel) at elevated temperatures. For example, a nickel-base catalyst or a mixture of calcium oxide and magnesium oxide is usually used for a hydrocarbon fuel such as gasoline. A mixture of chromium oxide and zinc oxide is suitable for methanol. A fluid mixer 30 for the preparation of the primary mixture is equipped with a fuel nozzle 31, an oxygen nozzle 33 communicating with the respective substances sources (not shown) via valves 34, 35 and 36, respectively. Air is frequently used as the oxygen source. The exhaust gas recirculation duct 17 is connected to the mixer 30.

In conventional systems for reforming the primary fuel, the fluid mixer 30 directly communicates with the reaction chamber 20. According to the invention, however, the mixer 30 is connected to an intake port 41 of a compressor 40. The compressor 40 has a reciprocating piston 42, a working chamber 43 defined above the piston 42, a discharge port 44 and an interjacent port 45. The interjacent port 45 allows the working chamber 43 to communicate directly with the reaction chamber 20. The discharge port 44 is connected to the fuel induction passage 11 of the engine 10 preferably through a gas reservoir 50. The intake port 41 and the discharge port 44 are respectively provided with an intake valve 46 and a discharge valve 47. The compressor 40 is equipped with a starter 48 or alternatively associated with the engine 10 through a clutch mechanism (not shown) for the starting thereof.

In operation, the engine 10 is operated by an air-fuel mixture resulting from the injection of an ordinary fuel such as gasoline from the nozzle 15 during an initial stage of the idling for warm-up. When the catalyst 21 is heated to a predetermined temperature by the exhaust gas flowing through the heat exchanger 22, the fuel injection from the nozzle 15 is stopped or restricted to a lower rate, and at the same time the three valves 34, 35 and 36 are opened to inject the primary fuel, oxygen or air and water into the mixer 30. As a result, the primary mixture is produced substantially in the gaseous form and further mixed with the exhaust gas recirculated into the mixer 30. The rate of the water supply from the nozzle 32 is determined taking into consideration the water content of the recirculated exhaust gas. These functions of the engine 10, heat exchanger 22 and the mixer 30 are similar to those in a conventional system.

In the system of FIG. 1, the compressor 40 is started when the preparation of the primary mixture in the mixer 30 is commenced. The intake and discharge valves 46 and 47 are controlled so as to allow the primary mixture to behave in the following manners. During the first stroke of the piston 42, the intake valve 46 is open but the discharge valve 47 is closed, so that the primary mixture is drawn into the working chamber 43 as the piston 42 moves downward. Both the two valves 46 and 47 are closed during the second or upward stroke of the piston 42, so that the primary mixture in the working chamber 43 is compressed and gradually forced out into the reaction chamber 20 through the interjacent port 45. The primary mixture is compressed to such an extent that the resulting pressure in the reaction chamber 20 is between about 20 and about 30 kg/cm$^2$. Thus the primary mixture comes into contact with the heated catalyst 22 and turns into the reformed mixture containing a relatively large amount of hydrogen gas together with carbon monoxide and carbon dioxide. The reformed mixture is at an elevated temperature and still under a high pressure. On the third stroke, the two valves 46 and 47 are still closed and the piston 42 moves downward. Accordingly, the reformed mixture flows into the working chamber 43 and expands threrein substantially adiabatically. The expansion of the hot mixture results in the reduction of the mixture temperature and does the work of pushing down the piston 42. On the fourth stroke, the discharge valve 47 is opened and the piston 42 moves upwardly to deliver the reformed mixture into the reservoir 50. The above four strokes are cycled during the running of the engine 10. The reformed mixture is intermittently discharged from the compressor 40 on each cycle and temporarily stored in the reservoir 50. Thereafter the reformed mixture is drawn into the mixer 13 through the fuel induction passage 11 and mixed with air from the induction passage 12 prior to the feeding to the engine 10.

Due to the preliminary compression of the primary mixture, the reactions in the reaction chamber 20 proceed more efficiently or at increased rates of reactions than in the similar chamber in conventional systems for the following reasons. The effective surface areas of the catalyst 21 can be substantially increased since the pressurized primary gaseous mixture permeates even into agglomerate and/or capillary regions of the catalyst 21. Thus the catalytic reactions of the primary fuel with the oxygen and steam are accelerated. Besides, the high pressure in the reaction chamber 20 enhances the heat conduction from the catalyst 21 and the heat exchanger 22 to the primary mixture.

The reformed mixture may be expanded prior to the feeding into the fuel induction passage 11 in any manner, but the expansion in the working chamber 3 of the compressor 40 is advantageous from the viewpoint of utilizing the force of the expansion most effectively. The work done on the piston 42 by the expanding mixture is sufficient in magnitude to allow the compressor 40 to run self-sustainingly or with the aid of no external power. Sometimes the compressor 40 even can supply a certain magnitude of surplus power to the engine 10 or auxiliary devices.

The interjacent port 45 of the compressor 40 may be provided with a valve 49 as shown by a phantom line in FIG. 1. This valve 49 is opened at a later stage of the second stroke and closed at the end of the third stroke. As a result, the compressed primary mixture can be discharged from the working chamber 43 more rapidly and easily during the second stroke, causing the reactions in the reaction chamber 20 to be accelerated and the magnitude of the work for the compression to be reduced.

Practically it is not so easy to supply pure oxygen to the fluid mixer 30 especially when the engine 10 is of a relatively small size or loaded on a vehicle, so that air is usually employed as the oxygen source. Air is, however, disadvantageous for the reactions in the reaction chamber 20 because of its large nitrogen content. We have contemplated hydrogen peroxide as a preferable oxygen source for the system of FIG. 1. As is known, hydrogen peroxide undergoes a catalytic decomposition into oxygen and water upon contant with a silver or nickel-base catalyst. The decomposition reaction is exothermic, so that the gaseous products of the decomposition are obtained at high temperatures ranging from about 230° to about 750°C when an aqueous solution of hydrogen peroxide in the concentration range of 50 to 90% is employed. This gaseous product exhibits a strong chemical activity due to the presence of a nascent oxygen therein besides the elevated temperature thereof. Therefore, the employment of the decomposition product of hydrogen peroxide as the oxygen and water sources for the primary mixture can aid the heating of the catalyst 21 and facilitate the oxidation of the carbon components in the primary fuel.

Figure 2:
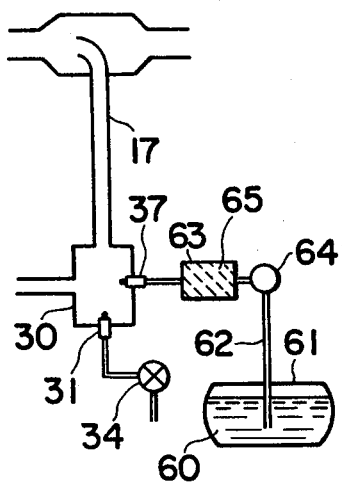
FIG. 2 is a diagram showing a slight and local modification of the system of FIG. 1 by the provision of a sub-system for producing oxygen and water from hydrogen peroxide.

FIG. 2 shows a preferred embodiment of the utilization of hydrogen peroxide in connection with the mixer 30 of FIG. 1. In this system, the oxygen nozzle 32 and water nozzle 33 of FIG. 1 are replaced with a single nozzle 37. The mixer 30 is unvaried in other respects. An aqueous solution of hydrogen peroxide 60 is kept in a tank 61, and a pipe 62 connects the tank 61 to a decomposition chamber 53 interposing a pump 64. The chamber 63 contains a conventional catalyst 65 for the decompositions of the hydrogen peroxide solution 60 and communicates with the nozzle 37.

The pump 64 is operated simultaneously with the fuel valve 34, so that a mixture of the primary fuel, oxygen, water and the recirculated exhaust gas is produced in the mixer 30 in a generally similar manner as in the case of FIG. 1. The thus produced primary mixture is then introduced into the compressor 40 and subjected to the process as described with regard to FIG. 1. The concentration of the hydrogen peroxide solution 60 may be varied depending on the desired amount of the water to feed to the mixer 30.

Figure 3:
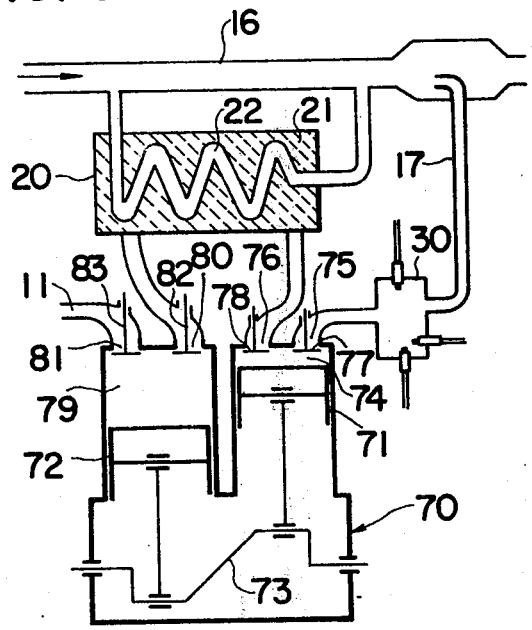
FIG. 3 is a diagram showing a variation of the compressor in the system of FIG. 1.

In a system of the invention, the compressor 40 is not limited to the one of FIG. 1, but may be modified to various forms. FIG. 3 shows an example of the modification. This compressor 70 has two pistons 71 and 72 connected to a single crank 73. A first working chamber 74 is defined above the first piston 71 and communicable with the mixer 30 through a first intake port 75 and with the reaction chamber 20 through a first discharge port 76. The two ports 75 and 76 are respectively equipped with a first intake valve 77 and a first discharge valve 78. A second working chamber 79 is defined above the second piston 72 so as to communicate with the reaction chamber 20 through a second intake port 80 and with the fuel induction passage 11 of the engine 10 through a second discharge port 81. The two ports 80 and 81 are equipped with a second intake valve 82 and a second discharge valve 83, respectively. One operation cycle of this compressor 70 consists of two strokes of the pistons 71 and 72, and the two pistons 71 and 72 moves always in the opposite directions.

On the first stroke, the first intake valve 77 and the second discharge valve 83 are opened and the first piston 71 moves downward, so that the primary mixture is drawn into the first working chamber 74. Then the two valves 77 and 83 are closed, and the first discharge valve 78 and the second intake valve 80 are opened on the second stroke. On this stroke, the first piston moves upwardly to compress the primary mixture in the first working chamber 74 and discharge it into the reaction chamber 20. Then the primary mixture turns into the reformed mixture, which is at a high temperature and pressurized. The reformed gas is drawn into the second working chamber 75 through the second intake port 80 and expanded therein during the second stroke, and thereafter discharged therefrom through the second discharge port 81 during the next first stroke.

It will be apparent that the important features of the invention, i.e., the compression of the primary mixture prior to the feeding into the reaction chamber 20 and expansion of the reformed mixture in the working chamber 79 of the compressor 70 are accomplished fundamentarily in the similar ways as in the case of FIG. 1 despite the difference in the compressor 70. The temperature reduction of the reformed mixture and the self-sustaining running of the compressor 70 are also similarly attained. In addition to these unvaried features, the arrangement of FIG. 3 has the advantages that the efficiencies of the reactions in the reaction chamber 20 are further improved due to the nearly continuous supply of the pressurized primary mixture and that the compressor 70 runs more smoothly due to almost continuous presence of the hot and pressurized reformed mixture in the reaction chamber 20.

The compressor 70 of FIG. 3 can be employed whether the hydrogen peroxide system of FIG. 2 is employed or not since the function of the compressor 70 or 40 is independent of the gas sources for the preparation of the primary mixture.

What is claimed is:

1. A system for the preparation of a fuel mixture to feed into an engine, comprising: first means to prepare a substantially gaseous first mixture at least of an organic fuel, oxygen and water; a reaction chamber containing therein a catalyst capable of converting said first mixture into a gaseous second mixture at least of hydrogene and carbon monoxide at elevated temperatures; second means to heat said catalyst; and a reciprocating compressor having at least one working chamber defined above a piston and provided with an intake valve and a discharge valve; said compressor being fluidly connected with said first means, said reaction chamber and the engine such that both said first means and the engine communicate with said reaction chamber through said working chamber, said compressor being constructed such that said first mixture is compressed in said working chamber and subsequently forced out into said reaction chamber to enhance the efficiencies of the reactions in said reaction chamber, and that said second mixture is drawn into and expanded in said working chamber to reduce the temperature of said second mixture and sustain the operation of said compressor, and subsequently discharged therefrom to the engine.

2. A system according to claim 1, wherein said compressor has a single reciprocating piston and a single working chamber defined above said piston, said working chamber being communicable with said first means and the engine through said intake port and said discharge port thereof, respectively, and communicating with said reaction chamber through an interjacent port thereof, said intake and discharge ports being equipped with an intake valve and a discharge valve, respectively, said intake and discharge valves being timed such that said first mixture is sucked into said working chamber on a first and downward stroke of said piston and then compressed and forced out into said reaction chamber during a second and upward stroke of said piston, and that said second mixture is sucked into said working chamber on a third and downward stroke of said piston and then discharged into the engine on a fourth and upward stroke of said piston.

3. A system according to claim 2, further comprising a gas reservoir arranged between said discharge port of said compressor and the engine.

4. A system according to claim 2, wherein said interjacent port is equipped with a valve timed in such a manner that said valve is opened at a later stage of said second stroke and closed at the end of said third stroke.

5. A system according to claim 1, wherein said compressor has two pistons connected to a single crank so as to reciprocate in the opposite directions to each other and two separate working chambers defined above the respective pistons, the first working chamber being communicable with said first means and said reaction chamber through an intake port and a discharge port thereof, respectively, the second working chamber being communicable with said reaction chamber and the engine through an intake port and a discharge port thereof, respectively, all of said intake and discharge ports of said first and second working chambers being equipped with intake and discharge valves, respectively, said intake and discharge valves being timed such that said first mixture is sucked into said first working chamber on a first and downward stroke of said first piston and then compressed and forced out into said reaction chamber during a second and upward stroke of said first piston, and that said second mixture is sucked into said second working chamber on said second stroke and then discharged into the engine on said first stroke.

6. A system according to claim 1, wherein said first means includes third means to prepare oxygen and water by a catalytic decomposition of an aqueous solution of hydrogen peroxide.

7. A system according to claim 1, wherein said first means is fluidly connected with an exhaust system of the engine such that a portion of the engine exhaust gas is mixed with said first mixture.

8. A system according to claim 1, wherein said second means is a heat exchanger disposed in said reaction chamber and arranged such that at least a portion of the exhaust gas from said engine passes therethrough.

* * * * *